Patented Oct. 11, 1949

2,484,395

UNITED STATES PATENT OFFICE 2,484,395

NITRITE SALTS OF ORGANIC NITROGEN BASES

Aaron Wachter and Nathan Stillman, Berkeley, Calif., assignors to Shell Development Company, San Francisco, Calif., a corporation of Delaware No Drawing. Application March 6, 1944, Serial No. 525,321

3 Claims. (Cl. 260—247)

This invention relates to nitrite salts of organic nitrogen bases and more particularly pertains to nitrite salts of organic heterocyclic nitrogen bases which contain as constituent atoms of the cyclic structure an oxygen atom and an amino nitrogen atom.

The nitrite salts of the invention have important industrial applications. They are useful, for example, as constituents of insecticidal compositions; as addition agents in the manufacture of rubber; as agents for use in the electrodeposition of metals; as medicinal agents; and as reagents for use as intermediates in the synthesis of other valuable organic compounds. Since they form stable solutions in many organic liquids as well as in water, they are particularly useful as corrosion inhibitors, especially for preventing the corrosion of metal pipelines, drums, tanks and the like which are used for the transportation and/or storage of organic liquids, particularly hydrocarbons, which are contaminated with variable quantities of water. This use of the presently described nitrite salts is disclosed and claimed in the copending application Serial No. 492,640, filed June 28, 1943, now Patent 2,419,327, of which this application is a continuation-in-part.

The nitrite salts of the invention comprise, in general, the nitrite salts of those heterocyclic nitrogen bases which contain an oxygen atom and an amino nitrogen atom as members of the heterocyclic structure. The ring structure should contain at least five atoms, a six-membered ring being a preferred structure. The oxygen atom and the nitrogen atom of the amino group may be in any position relative to each other provided that there is at least one carbon atom intermediate between them, thus insuring that the nitrogen atom is basic in character and retains its ability to form nitrite salts. Thus in the case of the six-membered heterocyclic rings the oxygen atom and the nitrogen atom may be in either the 1,3 or the 1,4 position relative to each other.

The cyclic structure may be either saturated or unsaturated. Any of the nuclear carbon atoms may be substituted with a suitable group such as, for example, an alkyl group or an aryl group. Suitable alkyl and aryl groups which may be present as substituents on the carbon atoms of the nucleus are the methyl, ethyl, n-propyl, isopropyl, n-butyl, secondary butyl, isobutyl, pentyl, hexyl, heptyl, octyl, nonyl, decyl, phenyl, alkyl phenyl, etc., groups, as well as such unsaturated radicals as the allyl, methallyl, crotyl, isocrotyl and phenyl ethylene radicals and the like. The nuclear carbon atoms or the alkyl groups substituent thereon may also be substituted with polar substituent groups of a stable, inert character. The number of such substituents should be limited, however, particularly if the compounds are to be used as corrosion inhibitors for metal surfaces in contact with wet organic liquids since such substituents tend to reduce the solubility of the nitrite salts in various organic substances, particularly in hydrocarbon oils and the like. Suitable polar groups or radicals include, for example, the chloro, bromo, ether, sulfide, hydroxyl and amino groups.

Preferred nitrite salts which are particularly powerful corrosion inhibitors and which have particularly desirable solubility characteristics are those which have a heterocyclic structure containing four substituted or unsubstituted carbon atoms, an amino nitrogen atom, and an oxygen atom, the said amino nitrogen atom and the said oxygen atom being in the 1,3 position relative to each other, and those which have a six-membered cyclic structure containing four substituted or unsubstituted carbon atoms, an amino nitrogen atom and an oxygen atom, the latter two atoms being in the 1,4 position relative to each other, i. e. being separated by two carbon atoms. 2,4,4,6-tetramethyltetrahydro-1,3-oxazine nitrite,

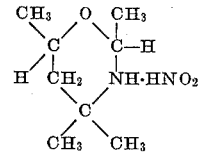

and morpholine nitrite (tetrahydro-1,4-oxazine nitrite),

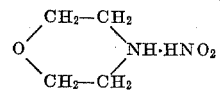

are representative examples of these preferred types of nitrite salts.

The nitrite salts of the present invention may be prepared by a variety of methods. They may be prepared, for example, by the stoichiometric reaction in an alkaline medium of an organic nitrogen base having the indicated structure with nitrous acid. Alternatively, the nitrite salts may be prepared by contacting the hydrochloride of a suitable organic nitrogen base with sodium nitrite in a solution in which the corresponding organic nitrogen base salt is insoluble. The reaction yields, by double decomposition, the salt as a precipitate, leaving an inorganic chloride in solution.

In another method of preparation an acetone solution of an organic nitrogen base may be prepared and dry hydrogen chloride gas passed therethrough. A reaction mixture is obtained from which precipitates the corresponding organic nitrogen base hydrochloride, which is usually relatively insoluble in cold acetone. Silver nitrite, freshly prepared from silver nitrate and sodium nitrite and dried with acetone, may then be mixed with the nitrogen base hydrochloride in acetone. A second reaction thereupon occurs, yielding an acetone solution of the nitrogen base nitrite salt and a silver chloride precipitate. Although in this instance both reactants are but slightly soluble in acetone, by reason of the extremely low solubility of the silver chloride in acetone, the reaction usually proceeds to completion at room temperature within a period of approximately one hour. The silver chloride may then be filtered from the acetone and the acetone filtrate evaporated to obtain the desired nitrogen base nitrite, which may be further purified by recrystallization from a suitable solvent.

A preferred method for preparing organic nitrogen base nitrite salts for the purposes of the present invention comprises slowly adding concentrated sulfuric acid to an aqueous solution of the nitrogen base and an at least equivalent amount of sodium nitrite, the reaction mixture being kept alkaline throughout the said addition. After the reaction has occurred, the mixture may be diluted to about 10 times its original volume with acetone, resulting in the formation of a solution of the nitrogen base nitrite salt and a precipitate of acetone insoluble inorganic salts such as sodium sulfate and sodium nitrite. After filtration of the insoluble salts the acetone solution may be evaporated to recover the organic nitrite salt, which may be further purified by recrystallization from a suitable solvent. If the nitrite salts are to be used as inhibitors they may be prepared in situ in some instances. This may be accomplished, for example, by passing nitrous acid gas through an oil containing the nitrogen base in solution, thus forming a water-and-oil-soluble nitrogen base nitrite salt.

Using the preferred method of preparation described above, morpholine nitrite and 2,4,4,6-tetramethyltetrahydro-1,3-oxazine nitrite were prepared. Morpholine nitrite was a salt-like substance having a melting point which was about 79° C. to 100° C. and a nitrite content of 33.8% (calculated, 34.4%). Its solubility in both benzene and iso-octane was approximately 0.005 g./100 ml. It was not decomposed by the prolonged action of boiling water.

The 2,4,4,6-tetramethyltetrahydro-1,3-oxazine nitrite was likewise a salt-like compound stable to the action of boiling water for a period of at least 6 hours. It contained 24.3% nitrite (calculated, 24.9%). Its approximate solubility at 150° F. in benzene and iso-octane, respectively, was 0.0017 g./100 ml. and 0.006 g./100 ml.

In a like manner are prepared from the corresponding cyclic bases: dihydro-1,3-oxazine nitrite, 5,6-dihydro-4-methyl-1,3-oxazine nitrite, tetrahydro-1,3-oxazine nitrite, 2-methyltetrahydro-1,3-oxazine nitrite, 4-ethyltetrahydro-1,3-oxazine nitrite, 5-n-propyltetrahydro-1,3-oxazine nitrite, 6-isopropyltetrahydro-1,3-oxazine nitrite, 2,4-dimethyltetrahydro-1,3-oxazine nitrite, 5,5-dimethyltetrahydro-1,3-oxazine nitrite, 5,6-diethyltetrahydro-1,3-oxazine nitrite, 5-methyl-6-propyltetrahydro-1,3-oxazine nitrite, 2,4,5-trimethyltetrahydro-1,3-oxazine nitrite, 2-methyl-5,6-diethyltetrahydro-1,3-oxazine nitrite, 2-methyl-5-ethyl-6-propyltetrahydro-1,3-oxazine nitrite, 2,4,5,6-tetramethyltetrahydro-1,3-oxazine nitrite, 4,4,6,6-tetraethyltetrahydro-1,3-oxazine nitrite, 2,2-dimethyl-5,5-diethyltetrahydro-1,3-oxazine nitrite, 2,2,4,5,6-pentamethyltetrahydro-1,3-oxazine nitrite, 2,2-dimethyl-5,5-diethyl-6-propyltetrahydro-1,3-oxazine nitrite, 6-chloro-tetrahydro-1,3-oxazine nitrite, 5-hydroxymethyltetrahydro-1,3-oxazine nitrite, dihydro-1,4-oxazine nitrite, 5,6-dihydro-3-methyl-1,4-oxazine nitrite, tetrahydro-1,4-oxazine nitrite, 2-methyltetrahydro-1,4-oxazine nitrite, 3-ethyltetrahydro-1,4-oxazine nitrite, 5-n-propyltetrahydro-1,4-oxazine nitrite, 6-isopropyltetrahydro-1,4-oxazine nitrite, 2,3-dimethyltetrahydro-1,4-oxazine nitrite, 5,5-dimethyltetrahydro-1,4-oxazine nitrite, 5,6-diethyltetrahydro-1,4-oxazine nitrite, 5-methyl-6-propyltetrahydro-1,4-oxazine nitrite, 2,3,5-trimethyltetrahydro-1,4-oxazine nitrite, 2-methyl-5,6-diethyltetrahydro-1,4-oxazine nitrite, 2-methyl-5-ethyl-6-propyltetrahydro-1,4-oxazine nitrite, 2,3,5,6-tetramethyltetrahydro-1,4-oxazine nitrite, 3,3,6,6-tetraethyltetrahydro-1,4-oxazine nitrite, 2,2-dimethyl-5,5-diethyltetrahydro-1,4-oxazine nitrite, 2,2,3,5,6-pentamethyltetrahydro-1,4-oxazine nitrite, 2,2-dimethyl-5,5-diethyl-6-propyltetrahydro-1,4-oxazine nitrite, 2-chloro-tetrahydro-1,4-oxazine nitrite, 3-hydroxymethyltetrahydro-1,4-oxazine nitrite.

We claim as our invention:

1. The nitrite salts of six-membered heterocyclic amines containing within their cyclic structure an oxygen atom, an amino nitrogen atom, and four saturated carbon atoms, the oxygen atom and the amino nitrogen atom being in the 1,4 position relative to each other, and at least one carbon atom being substituted with an alkyl group.

2. Morpholine nitrite.

3. The nitrite salt of a tetrahydro-1,4-oxazine.

AARON WACHTER.
NATHAN STILLMAN.

REFERENCES CITED

The following references are of record in the file of this patent:

UNITED STATES PATENTS

| Number | Name | Date |
|---|---|---|
| 615,488 | Knorr | Dec. 6, 1898 |
| 2,127,103 | Bruson et al. | Aug. 16, 1938 |
| 2,186,628 | Dickey | Jan. 9, 1940 |
| 2,252,385 | Orozco | Aug. 12, 1941 |
| 2,321,517 | Rosen | June 8, 1943 |
| 2,419,327 | Wachter | Apr. 22, 1947 |

OTHER REFERENCES

Chem. Abstracts, 1912, page 1285 and pages 1740–1741.

Chem. Abstracts, 1913, page 1489.

Journal Chem. Soc., vol. 101, pages 1608–1611 (1912).

Beilstein, vol. 27, pages 8, 10, 12.

Synthetic Organic Chemicals, published by the Carbide and Carbon Chemicals Corporation, 12th ed., July 1, 1945, pp. 75–76.